March 9, 1948. J. D. STACK 2,437,445
SOUND REVERBERATING DEVICE
Filed Nov. 7, 1944

INVENTOR
John D. Stack

BY Robt. L. Gunn
ATTORNEY

Patented Mar. 9, 1948

2,437,445

UNITED STATES PATENT OFFICE 2,437,445

SOUND REVERBERATING DEVICE

John David Stack, Van Nuys, Calif., assignor to Twentieth Century-Fox Film Corporation, Los Angeles, Calif., a corporation of New York Application November 7, 1944, Serial No. 562,315

15 Claims. (Cl. 178—44)

This invention relates to the art of recording and reproducing sound and deals particularly with an apparatus for introducing time delay, reverberation, echo, etc., into electrical circuits carrying a sound signal.

The invention to be hereinafter described has been developed primarily for use in the motion picture industry, but it will become evident as the description proceeds that the device will find usefulness in other fields, such as radio, television, stage, etc. The invention utilizes the principle of transmitting sound vibrations through a resilient coil spring. The novelty of my invention resides in the way the coil spring is used and in the circuit in which the coil spring is incorporated. Briefly stated, I employ a closed metallic circuit embodying springs, fulcrumed supports, dampers, etc. This corresponds to a closed electrical circuit having transformance, capacitance, inductance, and resistance, but provides me with units having low periodic vibration frequencies. The metallic circuit also has an input and output element the same as an electrical circuit and is connected in series in the electrical path of the signal. By causing the electrical signal to traverse a mechanical path in part of its circuit, it is possible to isolate the mechanical section from the electrical section and to modify the signal mechanically as it passes through the mechanical section and to thereby introduce time delay and other frequencies into the circuit much more easily than it would be to modify an electrical circuit. The mass and inertia in a mechanical circuit are much greater than in an electrical circuit and may be used to great advantage to derive longer time delays than are practical in an electrical circuit. By using my invention, a time delay of seven seconds or even more may be had. In addition, controlled reverberation and echo may also be introduced, thereby changing the characteristics of the signal. All of this is brought about by the use of a balanced metallic circuit in series with an electrical circuit.

In practice, my invention may be used to produce various useful effects heretofore impractical in an electrical circuit. For instance, to those versed in the motion picture art, it is well known that certain effects such as echo and reverberation involving time delay are essential to good sound recording. It is also known that it always has been a problem in the art of sound recording to control the ratio of reverberant sound to direct sound in the pick-up channel. By using my device, I may control this ratio directly and may even vary it to suit the taste of the director. Moreover, my device may be used to add a stereophonic sound effect through time delay, and by properly using my invention with an electrical sound circuit an illusion of amplification of spatial dimensions may be created. In addition, echo and cavernous noises may be added at will and an artificial increase in volume due to the echo effect may be brought about by properly adjusting the ratio of the volume of echo to direct sound and the time delay of the echo.

In conjunction with the metallic circuit, I incorporate certain novel adjustable features which render the circuit more useful and more flexible for use in certain fields. It therefore becomes the primary object of this invention to provide a sound reverberating device characterized by the ability to mechanically introduce into an electrical circuit carrying a sound signal certain frequency characteristics such as time delay, reverberation, and echo, involving time elements which heretofore have been impractical in such circuits. Another object is to provide in a device of the above character certain adjustable features which will give added utility to the device.

Other objects and advantages will become apparent as the description proceeds in conjunction with the drawings in which.

Figures 1, 2, 3:
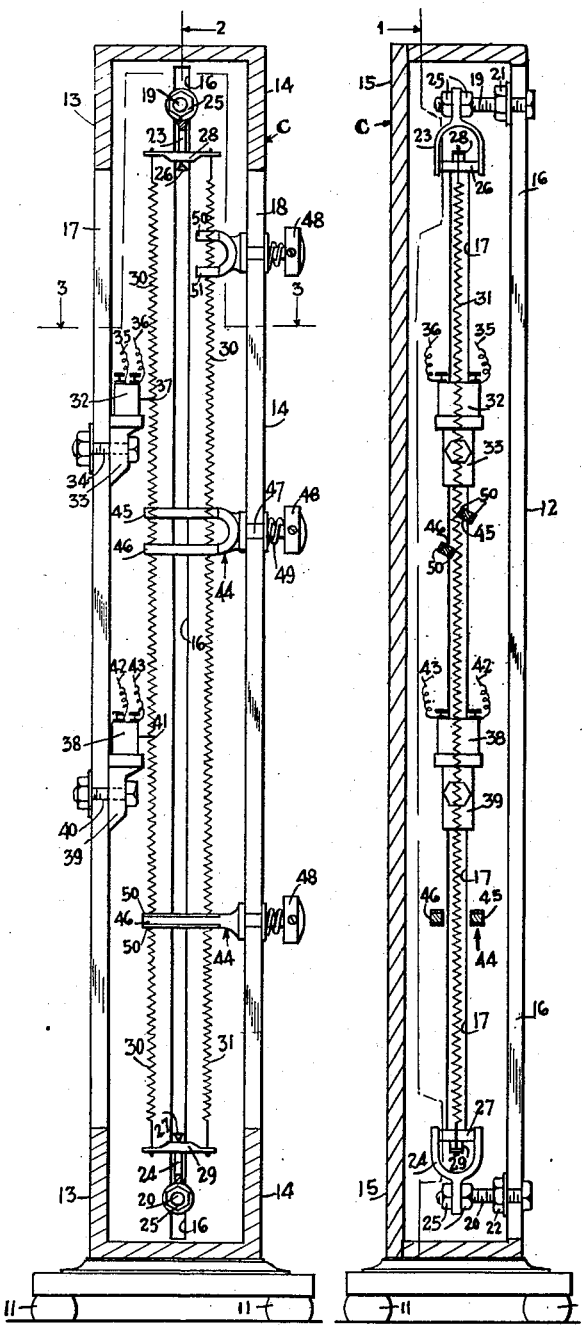
Figure 1 is a vertical section on line 1—1 of Figure 2.
Figure 2 is a vertical section on line 2—2 of Figure 1.
Figure 3 is a section on line 3—3 of Figure 1.

Referring to the drawing, it will be seen that my invention comprises a case generally designated C. The case may be mounted upon supports 11 which should be resilient, such as rubber or springs, to provide a more or less flexible support for the apparatus that will not be subject to vibration from outside sources.

As shown in Figure 3, the case C comprises a back wall 12, side walls 13 and 14, and a cover 15. No detailed description of the construction of the case is given, it being deemed sufficient to state that it may be formed of wood, plastic, or any other suitable material. Furthermore, it is not necessary that the case be entirely enclosed as shown, except for purposes of keeping out dust and foreign particles. As a further precaution in this direction, the entire assembly may be mounted in another case which could be soundproof and dust proof if desired. The back wall 11 is provided with a vertical slot 16 and the side walls 13 and 14 are provided with slots 17 and 18 respectively. The purpose of these slots will become evident in the following description.

In the slot 16, I mount bolts 19 and 20. These bolts are identical and are arranged to slide in the slot. As shown in Figures 1 and 2, the bolt 19 is placed near the top of the case and the bolt 20 is placed near the bottom of the case. They are clamped into position by nuts 21 and 22 respectively and may be adjustably moved along the slot as desired by loosening the nuts. On the outer end of the bolts 19 and 20, I mount stirrups 23 and 24 respectively which are held in position by any suitable means such as by clamp nuts 25. The stirrups 23 and 24 each carry a knife edge 26 and 27 respectively upon which fulcrumed supports 28 and 29 are respectively mounted. Connecting the outer ends of these supports are springs 30 and 31. The structure just described provides a suspended closed mechanical circuit comprising the two fulcrumed supports 28 and 29 and the two springs 30 and 31 which is free to oscillate in response to an input frequency.

My invention provides means for oscillating the mechanical circuit above described and also means for receiving oscillations from the circuit. The input means for this purpose is shown as an electro-mechanical transducer generally designated 32 which is mounted upon a bracket 33 that in turn is adjustably supported in the slot 17 by means of a bolt 34. The transducer 32 is equipped with conductors 35 and 36 which are connected to an electrical circuit (not shown) that provides a signal for oscillating the mechanical circuit. The means connecting the transducer 32 to the mechanical circuit consists of a stylus 37 which engages the spring and is suitably fixed thereto to provide a satisfactory transmission of vibrations from the stylus to the spring. It should be stated here that the stylus may be connected to the spring to set up oscillations along the axis of the spring or transverse to the axis with satisfactory results in either case. The pickup unit, which may also be termed the output unit of the mechanical circuit, consists of a mechanico-electro transducer generally designated 38 which is mounted upon a bracket 39 adjustably supported in the slot 17 by means of a bolt 40. The transducer 38 also has a stylus 41 suitably connected to the spring 30 whereby oscillation of the spring is transmitted through the stylus 41 to the transducer, where it is converted into electrical impulses and sent to a suitable electrical output circuit by conductors 42 and 43. The transducers 32 and 38 being mounted upon movable brackets may be moved in the slot 17 to any position found desirable and may thus be set at variable distances so that the time delay caused by the transmission of the vibrations through the spring 30 between the input element 32 and the output element 38 may be varied to meet specific requirements. As the mechanical circuit comprising the fulcrumed supports 28 and 29 and the springs 30 and 31 is set into oscillation, it becomes analogous to an electrical circuit. For example, the fulcrumed supports 28 and 29 may be said to be equivalent to transformers. The mass and weight of the springs become the equivalent of inductance and the resiliency of the spring is equivalent to capacitance. There is this difference, however, between the two circuits that I use to achieve my objectives and that is the fact that the elements of the mechanical circuit being solid material have a much lower periodic frequency and can therefore be treated mechanically to derive special effects such as excessive time delay, decaying reverberation, redundant echo, etc., which become impractical in an electrical circuit due to the highly complex and cumbersome equipment required to produce comparable results.

In addition to the transformance, inductance, and capacitance used in the mechanical circuit, I also introduce resistance. This may be brought about in several ways, but I prefer to introduce it by means of damping elements. One type of such element is shown and generally designated 44 in Figure 1. Here it will be observed I have mounted the element for movement in the slot 18. As shown, it is U-shaped and comprises two legs 45 and 46. The legs are held in the slot 18 by means of a pin 47 which is a part of the device and extends through the slot and is fitted with a head 48 on the outer end. Between the head 48 and the wall 14, I mount a spring 49 which provides sufficient pressure to yieldably hold the device fixed in the slot. When used as a resistive element, the legs 45 and 46 are turned until they engage the springs on opposite sides. The engaging surface of the legs 45 and 46 may be equipped with sound deadening material 50, such as small strips of felt, to increase the damping effect and to prevent reflection. This position is shown by the middle resistive element in Figures 1 and 2. When not in use, the device is turned in the position shown in the lower part of Figures 1 and 2. In the upper part of Figure 1, I have shown a slightly modified form of a resistive element which is identical with that just described with the exception that the legs 50 and 51 do not extend across the two springs but are arranged to engage one spring only. In practice, the resistive devices are arranged to be mounted in either or both of the slots 17 or 18 and may be moved up and down the slots to put the resistance at any desired point. In addition, the amount of resistance may be controlled by the pressure with which the legs engage the springs and this may be regulated by the knobs 48.

In operation, my reverberating unit is connected directly in series in an electrical circuit; that is, the input transducer 32 is connected to the electrical circuit through conductors 35 and 36, while the output of the mechanical circuit passes through transducer 38 and is put back into the electrical circuit through conductors 42 and 43. It thus becomes apparent that the electrical signal is temporarily converted into a mechanical signal and is isolated from any electrical connection. The purpose of this conversion and isolation is to put the signal in a mechanical form whereby it may be treated mechanically to derive effects such as prolonged time delay, reverberation, and echo of greater extent than would be possible in an electrical circuit. As before stated, the time delay may be controlled by the spacing between the transducers 32 and 38, while the reverberation brought about by the signal traveling the complete mechanical circuit may also be controlled by the position of the transducers and, in addition, may be regulated as to intensity by the resistive devices 44. In practice, it has been found that by making the fulcrumed supports 28 and 29 of extremely light material and of as small mass as possible, there is very little reflection in the circuit. Furthermore, the coiling of the springs, taking into consideration the number of turns per inch and the diameter of the turns, has been found to control the capacity of the circuit, while the size of the wire and the length of the wire controls the inductance of the circuit. By properly calculating these factors, a balanced circuit for desired frequency range may be constructed.

A device of the foregoing character will yield results not practical in an electrical circuit and has been used to produce time delays of several seconds with minimum distortion.

I claim:

1. A reverberating device of the character described comprising a pair of spaced substantially parallel helically wound springs, fulcrumed supports connecting the adjacent ends of said springs to form a closed metallic oscillatory circuit, an electro-mechanical transducer for oscillating said circuit, and a mechanico-electrical transducer for converting said oscillations into electrical impulses.

2. In a reverberating device of the character described a closed circuit comprising a pair of spaced substantially parallel helically wound springs with fulcrumed supports at each end of said springs connecting the adjacent ends thereof, means for oscillating said circuit, and means for converting said oscillations into electrical impulses.

3. A reverberating device of the character described comprising a casing having a back wall and side walls, a pair of spaced posts mounted in said back wall, a member having a knife edge attached to each of said posts, a pair of spaced helically wound springs extending between said posts, levers mounted on each of said knife edges connecting the adjacent ends of said springs, an electro-mechanical transducer mounted on one of said side walls arranged to engage one of said springs and set up vibrations in said springs and levers, and a mechanico-electrical transducer mounted on one of said side walls arranged to engage one of said springs and convert said vibrations into electrical impulses.

4. The elements of claim 3 and means for moving said posts on said back wall to increase or decrease the tension in said springs.

5. The elements of claim 3 and means for moving said electro-mechanical transducer on said side wall to change the point at which said transducer engages said spring.

6. The elements of claim 3 and means for moving said mechanico-electrical transducer on said side wall to change the point at which said transducer engages said spring.

7. The elements of claim 3 and, in addition thereto, means for moving said electro-mechanical transducer on said side wall to change the point at which said transducer engages said spring, and means for moving said mechanico-electrical transducer on said side wall to change the point at which said transducer engages said spring.

8. The elements of claim 3 and, in addition thereto, means for moving said electro-mechanical transducer on said side wall to change the point at which said transducer engages said spring, means for moving said mechanico-electrical transducer on said side wall to change the point at which said transducer engages said spring, and means for moving said posts on said back wall to increase or decrease the tension in said springs.

9. The elements of claim 3 and means mounted on one of said side walls for damping the oscillations in said circuit, said last mentioned means including a substantially U-shaped member arranged to straddle said springs and engage said springs on opposite sides thereof by rotating said member in said side wall.

10. The elements of claim 3 and means mounted on one of said side walls for damping the oscillations in said circuit, said last mentioned means including a substantially U-shaped member arranged to straddle said springs and engage said springs on opposite sides thereof by rotating said member in said side wall, and means for moving said damping element on said side wall to change the point at which said element engages said springs.

11. A reverberating device of the character described comprising a pair of spaced substantially parallel helically wound springs, fulcrumed supports connecting the adjacent ends of said springs to form a closed metallic oscillatory circuit, an electro-mechanical transducer having means thereon for engaging one of said springs to oscillate said circuit, means for adjusting the position of said transducer to engage said spring at various points thereon, and a mechanico-electrical transducer for converting said oscillations into electrical impulses.

12. A reverberating device of the character described comprising a pair of spaced substantially parallel helically wound springs, fulcrumed supports connecting the adjacent ends of said springs to form a closed metallic oscillatory circuit, an electro-mechanical transducer for oscillating said circuit, a mechanico-electrical transducer having means thereon for engaging one of said springs for converting said oscillations into electrical impulses, and means for adjusting the position of said mechanico-electrical transducer to engage said spring at various points thereon.

13. A reverberating device of the character described comprising a pair of spaced substantially parallel helically wound springs, fulcrumed supports connecting the adjacent ends of said springs to form a closed metallic oscillatory circuit, an electro-mechanical transducer having means thereon for engaging one of said springs to oscillate said circuit, means for adjusting the position of said transducer to engage said spring at various points thereon, a mechanico-electrical transducer having means thereon for engaging one of said springs for converting said oscillations into electrical impulses, and means for adjusting the position of said last mentioned transducer to engage said spring at various points thereon.

14. In a reverberating device of the character described a closed circuit comprising a pair of spaced substantially parallel helically wound springs with fulcrumed supports at each end of said springs connecting the adjacent ends of said springs, means for engaging one of said springs at various points to oscillate said circuit, and means for engaging one of said springs at various points for converting said oscillations into electrical impulses.

15. In a reverberating device of the character described a closed circuit comprising a pair of spaced substantially parallel helically wound springs with fulcrumed supports at each end of said springs connecting the adjacent ends of said springs, means for oscillating said circuit, means for adjustably damping the oscillations of said circuit, and means for converting said oscillations into electrical impulses.

JOHN DAVID STACK.

REFERENCES CITED

The following references are of record in the file of this patent:

UNITED STATES PATENTS

| Number | Name | Date |
|---|---|---|
| 2,230,836 | Hammond | Feb. 4, 1941 |